US012672945B1

(12) United States Patent
He et al.

(10) Patent No.: US 12,672,945 B1
(45) Date of Patent: Jul. 7, 2026

(54) ELECTRIC TOOTHBRUSH HEAD AND ASSEMBLY METHOD THEREFOR

(71) Applicant: Shenzhen Baolijie Technology Co., Ltd., Shenzhen (CN)

(72) Inventors: Huajie He, Shenzhen (CN); Shuai Yuan, Shenzhen (CN); Mingfeng He, Shenzhen (CN)

(73) Assignee: Shenzhen Baolijie Technology Co., Ltd., Shenzhen (CN)

( * ) Notice: Subject to any disclaimer, the term of this patent is extended or adjusted under 35 U.S.C. 154(b) by 0 days.

(21) Appl. No.: 19/356,073

(22) Filed: Oct. 11, 2025

(30) Foreign Application Priority Data

Sep. 4, 2025 (CN) .......................... 202511267063.8

(51) Int. Cl.
| | |
|---|---|
| *A61C 17/22* | (2006.01) |
| *A61C 17/34* | (2006.01) |
| *A46B 9/04* | (2006.01) |

(52) U.S. Cl.
CPC ........ *A61C 17/3436* (2013.01); *A61C 17/222* (2013.01); *A61C 17/3481* (2013.01); *A46B 9/04* (2013.01)

(58) Field of Classification Search
CPC ......... A46B 5/0095; A46B 9/04; A46B 13/02; A61C 17/22
See application file for complete search history.

(56) References Cited

U.S. PATENT DOCUMENTS

| | | | | |
|---|---|---|---|---|
| 5,625,916 A | * | 5/1997 | McDougall | ........ A61C 17/3436 15/28 |
| 7,020,925 B1 | * | 4/2006 | Gitelis | ............... A61C 17/3436 15/28 |
| 7,310,844 B1 | * | 12/2007 | Rehkemper | ............... F03G 1/00 185/39 |
| 9,439,741 B2 | * | 9/2016 | Dishon | .................... A46B 9/04 |
| 10,966,807 B1 | * | 4/2021 | Arafat | ...................... A46B 9/04 |
| 11,071,612 B1 | * | 7/2021 | Zhou | .................... A46B 5/0095 |
| 2005/0055784 A1 | * | 3/2005 | Wong | ................. A61C 17/3436 15/22.1 |
| 2019/0175320 A1 | * | 6/2019 | Bloch | .................. A46B 5/0095 |
| 2022/0211166 A1 | * | 7/2022 | Wagner | ............... A61C 17/222 |
| 2023/0301423 A1 | * | 9/2023 | Ruan | ................. A61C 17/3436 |
| 2023/0320828 A1 | * | 10/2023 | Scherrer | ........... A61C 17/3436 15/167.1 |

(Continued)

*Primary Examiner* — Michael D Jennings
(74) *Attorney, Agent, or Firm* — Hemisphere Law, PLLC

(57) ABSTRACT

An electric toothbrush head and an assembly method therefor are provided. The electric toothbrush head includes a housing defined with a mounting chamber and an accommodating chamber, a brush head assembly including a bracket and a bristle planting head, and a driving assembly including a push rod and an elastic piece. The accommodating chamber is connected to the mounting chamber. The bracket is fixedly disposed inside the mounting chamber and defined with a matching hole. The bristle planting head includes a rotary connecting part, a limiting part, and a linkage shaft. The rotary connecting part is rotatably matched with the matching hole. The limiting part is connected to the rotary connecting part. The linkage shaft is eccentrically disposed relative to the rotary connecting part. The push rod is movably disposed inside the accommodating chamber. The elastic piece is disposed in the mounting chamber.

16 Claims, 9 Drawing Sheets

(56)     References Cited

U.S. PATENT DOCUMENTS

2025/0017708 A1*   1/2025   Xiong ................... A61C 17/222
2025/0128082 A1*   4/2025   Wang .................... A61N 5/0624
2025/0375278 A1*  12/2025   Zeng ...................... A46B 13/04

* cited by examiner

A - A

B-B

A - A

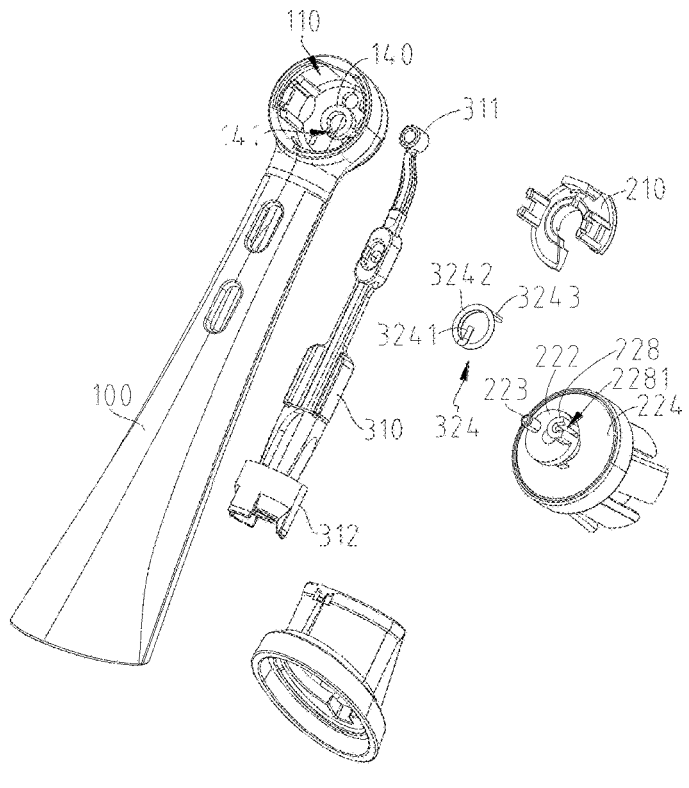

FIG. 17

| providing a bracket and a bristle planting head, wherein the bracket is defined with a matching hole and a notch, the notch is defined on a side surface of the bracket and connected to the matching hole, and the bristle planting head comprises a rotary connecting part and a linkage shaft; and clamping the rotary connecting part into the matching hole through the notch | S110 |
| --- | --- |
| providing a housing and a driving rod, wherein the housing is defined with a mounting chamber and an accommodating chamber, and the accommodating chamber is connected to the mounting chamber; installing the driving rod into the accommodating chamber; and making an end of the driving rod extend to the mounting chamber | S120 |
| installing the bristle planting head and the bracket into the mounting chamber together, wherein the bracket is matched with the mounting chamber, and the linkage shaft is connected to the driving rod | S130 |

FIG. 18

ELECTRIC TOOTHBRUSH HEAD AND ASSEMBLY METHOD THEREFOR

TECHNICAL FIELD

The disclosure relates to the technical field of electric toothbrushes, and more particularly to an electric toothbrush head and an assembly method therefor.

BACKGROUND

Related art has disclosed a brush head of an electric toothbrush. The brush head has left and right rotation functions. An inner side of the brush head includes a rotatable bristle brush, a rotor used to drive the bristle brush, and a pull rod eccentrically disposed on the rotor and used to pull the rotor to rotate. A pressing plate is movably sleeved on a surface of the rotor, and a protrusion clamped with the inner side of the brush head is disposed on the pressing plate to limit the rotor to the inner side of the brush head. By disposing the bristle brush, the pressing plate, the rotor, and a clamping block, the rotor is limited to the inner side of the brush head through the pressing plate, so that the rotor can rotate stably in the brush head. However, the brush head has deficiencies of complicated structure, cumbersome assembly process, and high cost.

SUMMARY

The disclosure aims to solve at least one of technical problems in the art. Therefore, the disclosure provides an electric toothbrush head and an assembly method therefor to effectively simplify an assembly process of the electric toothbrush head and reduce a cost of the electric toothbrush head.

In a first aspect, the electric toothbrush head provided by an embodiment of the disclosure includes a housing, a brush head assembly, and a driving assembly. The housing is defined with a mounting chamber and an accommodating chamber. The accommodating chamber is connected to the mounting chamber. The brush head assembly includes a bracket and a bristle planting head. The bracket is fixedly disposed inside the mounting chamber. The bracket is defined with a matching hole. The bristle planting head includes a rotary connecting part, a limiting part and a linkage shaft. The rotary connecting part is rotatably matched with the matching hole. The limiting part is connected to the rotary connecting part. The linkage shaft is disposed on the limiting part and eccentrically disposed relative to the rotary connecting part. The driving assembly includes a push rod and an elastic piece. The push rod is movably disposed inside the accommodating chamber. An end of the push rod is rotatably connected to the linkage shaft, and another end of the push rod is configured to match with an external main shaft. The elastic piece is disposed inside the mounting chamber and configured to drive the push rod to move facing away from the linkage shaft.

It can be seen from the above-mentioned technical solutions, the disclosure at least has the following beneficial effects.

In the electric toothbrush head provided by the disclosure, the bristle planting head can be rotatably matched with the matching hole of the bracket through the rotary connecting part and can be disposed inside the mounting chamber of the housing through the bracket. In this way, under a condition of realizing a reciprocating circular rotation of the bristle planting head with the rotary connecting part as a rotating axis, a structural design of the brush head assembly can be simplified, which is beneficial to simplifying the assembly process of the electric toothbrush head and reducing the cost of the electric toothbrush head. Meanwhile, embodiments of the disclosure use the external main shaft to push the push rod to move toward the linkage shaft and use the elastic piece to drive the push rod to reset. In this way, the external main shaft and the push rod of the electric toothbrush head do not need to be relatively fixed, and the push rod can reciprocate along its own axal direction, so that a connection structure between the push rod and the external main shaft can be simplified, which is beneficial to further reducing a use cost of users. In addition, the embodiments of the disclosure enable the elastic piece to be closer to the bristle planting head by disposing the elastic piece inside the mounting chamber. In this way, a force exerted by the elastic piece can be more directly transmitted to the bristle planting head to drive the bristle planting head to turn and circularly rotate, thereby improving force transmission efficiency of the elastic piece. When the elastic piece is disposed inside the mounting chamber, a volume of the elastic piece is relatively small, and a deformation amplitude of the elastic piece is relatively small. In this way, under a condition of high-frequency vibration, resonance, vibration, uncertain deformation, or displacement generated by the elastic piece can be reduced, which is helpful to improve working stability of the elastic piece, thereby improving stability of circular rotation of the bristle planting head and further reducing working noise.

In an embodiment, the bristle planting head includes a bristle planting disc. The bristle planting disc is connected to an end of the rotary connecting part facing away from the limiting part. The bracket includes a matching part. The matching hole is defined in the matching part. A cross-sectional area of the limiting part is larger than that of the matching hole. The matching part is disposed between the bristle planting disc and the limiting part.

In an embodiment, the bracket includes an abutting part. The abutting part is disposed on a side of the matching part facing toward the bristle planting disc and protrudes relative to a surface of the matching part. A cross-sectional area of the abutting part is smaller than an area of an end surface of the matching part facing toward the bristle planting disc.

In an embodiment, a distance between the matching part and the bristle planting disc gradually decreases along a radial direction of the matching hole.

In an embodiment, a notch is defined on a side surface of the bracket. The notch is connected to the matching hole. A minimum distance of two ends of the notch is smaller than a diameter of the rotary connecting part. The notch is configured to allow the rotary connecting part to pass through and move into the matching hole.

In an embodiment, a width of the notch gradually increases along a direction facing away from the rotary connecting part.

In an embodiment, the bracket includes first fixing parts. The first fixing parts are disposed on a side of the bracket facing toward a bottom wall of the mounting chamber. The first fixing parts are provided with guiding surfaces and accommodating grooves. The accommodating grooves are defined between the guiding surfaces and the bristle planting head. The accommodating grooves are defined by recessing toward a side facing toward the rotary connecting part with positions of tail parts of the guiding surfaces as references, respectively. Second fixing parts are disposed on a chamber wall of the mounting chamber at positions corresponding to the accommodating grooves. The second fixing parts are clamped and matched with the accommodating grooves, respectively. Each of the second fixing parts is partially located between two side walls of a corresponding one of the accommodating grooves along a circumferential direction of the rotary connecting part.

In an embodiment, two convex structures are disposed on the chamber wall of the mounting chamber at positions corresponding to two sides of each of the first fixing parts. A limiting groove is defined between the two convex structures. Each of the first fixing parts is at least partially disposed inside the limiting groove. The limiting grove is configured to limit rotation of a corresponding one of the first fixing parts along the circumferential direction of the rotary connecting part.

In an embodiment, a limiting step is disposed on the housing at an opening of the mounting chamber. The limiting step is configured to abut against a lower end surface of the bracket.

In an embodiment, a first positioning part is disposed on the chamber wall of the mounting chamber. The push rod is provided with a second positioning part. An end of the elastic piece is abutted against the first positioning part, and another end of the elastic piece is connected to the second positioning part. The elastic piece is disposed on an extension side of the push rod.

In an embodiment, the elastic piece is a spring or an elastic plate.

In an embodiment, the elastic piece is a first torsion spring. The first torsion spring includes a first connecting end, a torsion spring body, and a second connecting end. The first connecting end is connected to an end of the torsion spring body, and the second connecting end is connected to another end of the torsion spring body. The bracket is defined with a first connecting hole. The first connecting end is matched with and connected to the first connecting hole. The torsion spring body is spirally wound around on a periphery of the limiting part. The limiting part is defined with a second connecting hole. The second connecting end is matched with and connected to the second connecting hole.

In an embodiment, the elastic piece is a second torsion spring. A first connecting column is disposed on the bracket. A positioning column is disposed on the limiting part. The second torsion spring includes a third connecting end and a fourth connecting end. The third connecting end is sleeved on a periphery of the first connecting column. The fourth connecting end is sleeved on a periphery of the positioning column.

In an embodiment, the second torsion spring includes a first torsion part and a second torsion part. An end of the first torsion part is connected to the third connecting end, and another end of the first torsion part is connected to an end of the second torsion part. The first torsion part extends to a rotation axis of the rotary connecting part along a radial direction of the rotary connecting part. An accommodating hole is defined at a center of the limiting part. The second torsion part is at least partially disposed inside the accommodating hole. Another end of the second torsion part is connected to the fourth connecting end.

In an embodiment, a second connecting column is disposed on a bottom of the mounting chamber. The elastic piece is a third torsion spring. The third torsion spring includes a fixed abutting section, a first spiral section, and a first elastic driving rod sequentially connected in that order. The fixed abutting section is abutted against the chamber wall of the mounting chamber. The first spiral section is sleeved on a periphery of the second connecting column.

The bristle planting head is provided with an abutting structure. The first elastic driving rod is abutted against a side surface of the abutting structure.

In an embodiment, a third connecting column is disposed on the bottom of the mounting chamber. The third connecting column is concentrically disposed relative to the rotary connecting part. The third connecting column is defined with a first positioning groove. The elastic piece is a fourth torsion spring. The fourth torsion spring includes a rotation stopping part, a second spiral section and a second elastic driving rod sequentially connected in that order. The rotation stopping part is matched with the first positioning groove. The second spiral section is sleeved on a periphery of the third connecting column. The second elastic driving rod is connected to the limiting part to thereby drive the limiting part to rotate.

In an embodiment, a fourth connecting column is disposed on the limiting part. The fourth connecting column is eccentrically disposed relative to the rotary connecting part. The fourth connecting column is defined with a second positioning groove. The second positioning groove extends along an axial direction of the rotary connecting part. The second positioning groove extends along the radial direction of the rotary connecting part. The second elastic driving rod is movably disposed inside the second positioning groove.

In a second aspect, the assembly method for the electric toothbrush head provided by the disclosure includes the following steps:

providing the bracket and the bristle planting head, in which the bracket is defined with the matching hole and the notch, the notch is defined on the side surface of the bracket and connected to the matching hole, and the bristle planting head includes the rotary connecting part and the linkage shaft; and clamping the rotary connecting part into the matching hole through the notch;

providing the housing and the push rod, in which the housing is defined with the mounting chamber and the accommodating chamber, and the accommodating chamber is connected to the mounting chamber; installing the push rod into the accommodating chamber; and making an end of the push rod extend to the mounting chamber; and installing the bristle planting head and the bracket into the mounting chamber together, in which the bracket is matched with the mounting chamber, and the linkage shaft is connected to the push rod.

It can be seen from the above-mentioned technical solutions that the disclosure at least has the following beneficial effects.

In the assembly method for the electric toothbrush head provided by the disclosure, the rotary connecting part of the bristle planting head is installed into the matching hole through the notch on the side surface of the bracket. By cooperating the matching hole with the rotary connecting part, positioning of the bristle planting head in a cross section of the matching hole is achieved. At the same time, positioning of the bristle planting head along an axial direction of the matching hole is achieved through the bracket. In this way, under the condition of realizing the reciprocating circular rotation of the bristle planting head with the rotary connecting part as the rotating axis, it is beneficial to simplifying the assembly process of the electric toothbrush head and reducing the cost of the electric toothbrush head.

BRIEF DESCRIPTION OF DRAWINGS

To more clearly describe technical solutions in embodiments of the disclosure or in related art, attached drawings needed in description of the embodiments of the disclosure or the related art will be briefly introduced below. Apparently, the attached drawings described below are only some embodiments of the disclosure. For those skilled in the art, other attached drawings can be obtained based on these attached drawings without creative labor.

FIG. 17 illustrates an exploded structural view of the electric toothbrush head according to an embodiment of the disclosure.

FIG. 18 illustrates a flowchart of an assembly method for the electric toothbrush head according to an embodiment of the disclosure.

DESCRIPTION OF REFERENCE NUMERALS

Figure 1:
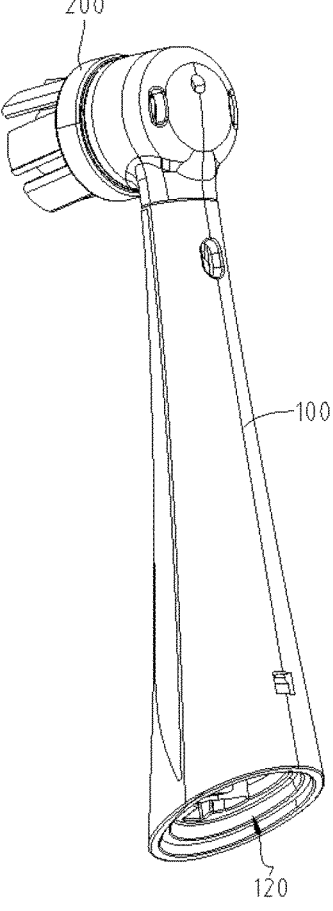
FIG. 1 illustrates a schematic overall structural view of an electric toothbrush head according to an embodiment of the disclosure.

100: housing; 110: mounting chamber; 111: second fixing part; 112: convex structure; 113: first positioning part; 114: limiting groove; 120: accommodating chamber; 130: second connecting column; 140: third connecting column; 141: first positioning groove; 150: limiting step;
200: brush head assembly; 210: bracket; 211: matching part; 2111: matching hole; 2112, notch; 2113: first slope surface; 212: first fixing part; 2121: guiding surface; 2122: accommodating groove; 213: abutting part; 214: first connecting hole; 215: movable groove; 216: lower end surface; 217: first connecting column; 220: bristle planting head; 221: rotary connecting part; 222: limiting part; 2221: second connecting hole; 2222: accommodating hole; 223: linkage shaft; 224: bristle planting disc; 225: central shaft; 226: positioning column; 227: abutting structure; 228: fourth connecting column; 2281: second positioning groove; 229: rotary limiting block;
310: push rod; 311: first connecting part; 312: second connecting part; 3121: connecting body; 3122: guiding structure; 3123: connecting slope surface; 313: second positioning part; 320: elastic piece; 321: first torsion spring; 3211: first connecting end; 3212: torsion spring body; 3213: second connecting end; 322: second torsion spring; 3221: third connecting end; 3222: fourth connection end; 3223: first torsion part; 3224: second torsion part; 323: third torsion spring; 3231: fixed abutting section; 3232: first spiral section; 3233: first elastic driving rod; 324: fourth torsion spring; 3241: rotation stopping part; 3242: second spiral section; 3243: second elastic driving rod.

DETAILED DESCRIPTION OF EMBODIMENTS

Technical solutions of the disclosure will be clearly and completely described as follows with reference to attached drawings in embodiments of the disclosure. Apparently, the embodiments described below are only part of the embodiments of the disclosure, not all of them. Base on the embodiments of the disclosure, all other embodiments obtained by those skilled in the art without creative labor shall fall within a scope of protection of the disclosure.

As illustrated in FIG. 1 through FIG. 4, in a first aspect, an electric toothbrush head provided by an embodiment of the disclosure includes a housing 100, a brush head assembly 200, and a driving assembly.

The housing 100 is defined with a mounting chamber 110 and an accommodating chamber 120. The mounting chamber 110 is configured to install the brush head assembly 200. The accommodating chamber 120 is connected to the mounting chamber 110.

Specifically, the brush head assembly 200 includes a bracket 210 and a bristle planting head 220. The bracket 210 is fixedly disposed inside the mounting chamber 110. The bracket 210 is defined with a matching hole 2111. The bristle planting head 220 includes a rotary connecting part 221, a limiting part 222, and a linkage shaft 223. The rotary connecting part 221 is rotatably matched with the matching hole 2111. The limiting part 222 is connected to the rotary connecting part 221. The linkage shaft 223 is disposed on the limiting part 222 and eccentrically disposed relative to the rotary connecting part 221.

The driving assembly includes a push rod 310 and an elastic piece 320. The push rod 310 is movably disposed inside the accommodating chamber 120. An end of the push rod 310 is rotatably connected to the linkage shaft 223, and another end of the push rod 310 is configured to match with a main shaft. The elastic piece 320 is disposed inside the mounting chamber 110 and configured to drive the push rod 310 to move toward a side facing away from the linkage shaft 223.

In aforementioned embodiment, the main shaft is configured to drive the push rod 310 to move along its own axial direction and toward a side facing toward the linkage shaft

223, to thereby drive the bristle planting head 220 to circularly rotate in a first direction. The elastic piece 320 is configured to drive the bristle planting head 220 to circularly rotate in a reverse direction of the first direction, to thereby drive the push rod 310 to move toward the side facing away from the linkage shaft 223. In this way, the bristle planting head 220 can reciprocatively rotate around an axis of the rotary connecting part 221.

As illustrated in FIG. 1 through FIG. 6, when the push rod 310 moves along its own axial direction and toward the side facing toward the linkage shaft 223, the elastic piece 320 is pushed and compressed by the push rod 310. When the main shaft moves toward the side facing away from the linkage shaft 223, the elastic piece 320 can stop the push rod 310 and drive the push rod 310 to move along its own axis and toward a side facing away from the rotary connecting part 221. In this way, by driving the push rod 310 to move along its own longitudinal direction through the main shaft, combined with action of the elastic piece 320, the push rod 310 can reciprocate along its own axial direction. As a result, the push rod 310 can drive the linkage shaft 223 to reciprocate, causing the bristle planting head 220 to reciprocatively rotate with the rotary connecting part 221 as a rotating axis.

It should be understood that, the elastic piece 320 can be directly connected to the push rod 310 to directly drive the push rod 310 to move. Apparently, the elastic piece 320 can also be indirectly connected to the push rod 310 to indirectly drive the push rod 310 to move. For example, the elastic piece 320 can be connected to the limiting part 222, and the limiting part 222 drives the bristle planting head 220 to rotate, so that the bristle planting head 220 then drive the push rod 310 to move through the linkage shaft 223.

In addition, in some embodiments, the bristle planting head 220 can be rotatably installed on the housing 100 through the bracket 210 without a need for a central shaft 225, which is beneficial to further simplifying a structure of the brush head assembly 200 and simplifying an assembly process of the brush head assembly 200.

In a solution, an electric toothbrush uses a spring to drive the push rod to reset by sleeving the spring on an end of the push rod facing away from the bristle planting head. In this solution, since the spring is sleeved on a periphery of the push rod, a spiral radius of the spring needs to be set larger than a radius of the push rod. When the electric toothbrush works, linear motion of the push rod presents high-frequency vibration. Under a condition of high-frequency vibration, the spring is prone to situations such as resonance, uncertain deformation, and displacement, which easily leads to poor working stability of the spring, large working noise and reduced force transmission efficiency of the spring.

Compared with the aforementioned solution, in the embodiments of the disclosure, the elastic piece 320 is closer to the bristle planting head 220 by disposing the elastic piece 320 inside the mounting chamber 110. In this way, a force exerted by the elastic piece 320 can be more directly transmitted to the bristle planting head 220 to drive the bristle planting head 220 to turn and circularly rotate, thereby improving force transmission efficiency of the elastic piece 320. In addition, to dispose the elastic piece 320 inside the mounting chamber 110, a volume of the elastic piece 320 needs to be designed relatively small. In this way, a deformation amplitude of the elastic piece 320 is relatively small. Under the condition of high-frequency vibration, resonance, vibration, uncertain deformation or displacement generated by the elastic piece 320 can be reduced, which is helpful to improve working stability of the elastic piece 320, thereby improving rotation stability of the bristle planting head 220 and further reducing the working noise.

The main shaft of some electric toothbrushes can be fixedly connected to the push rod 310 inside a replaceable brush head through magnetic attraction. Linear vibration of the main shaft drives the push rod 310 to reciprocate, thereby driving the bristle planting head 220 connected to the push rod 310 to swing and rotate around the rotating axis. However, in this solution, it is necessary to dispose a magnet on an end of the main shaft connected to the push rod 310, and dispose another magnet or magnetizable element at an end of the push rod 310 connected to the main shaft. A cost of these components is high, resulting in a higher cost of a brush head.

In the embodiments of the disclosure, by disposing the elastic piece 320 inside the mounting chamber 110, the elastic piece 320 is used to directly or indirectly drive the push rod 310 to reset, so that the push rod 310 can reciprocate along its own axial direction. By disposing the elastic piece 320, a need for magnets to connect the main shaft to the push rod 310 is avoided, which is beneficial to reducing cost.

In the embodiment, the elastic piece 320 can be the spring or a torsion spring. When the elastic piece 320 is the torsion spring, different from force transmission through an elastic force or a magnetic force, the torsion spring can achieve force transmission through a torsion force, resulting in higher force transmission efficiency and better stability.

It should be noted that, the linkage shaft 223 can be fixedly connected to the limiting part 222, for example, the linkage shaft 223 is integrally formed with the limiting part 222. Apparently, the linkage shaft 223 can also be installed in an installation hole of the limiting part 222 by assembly, which is not limited here.

Figure 2:
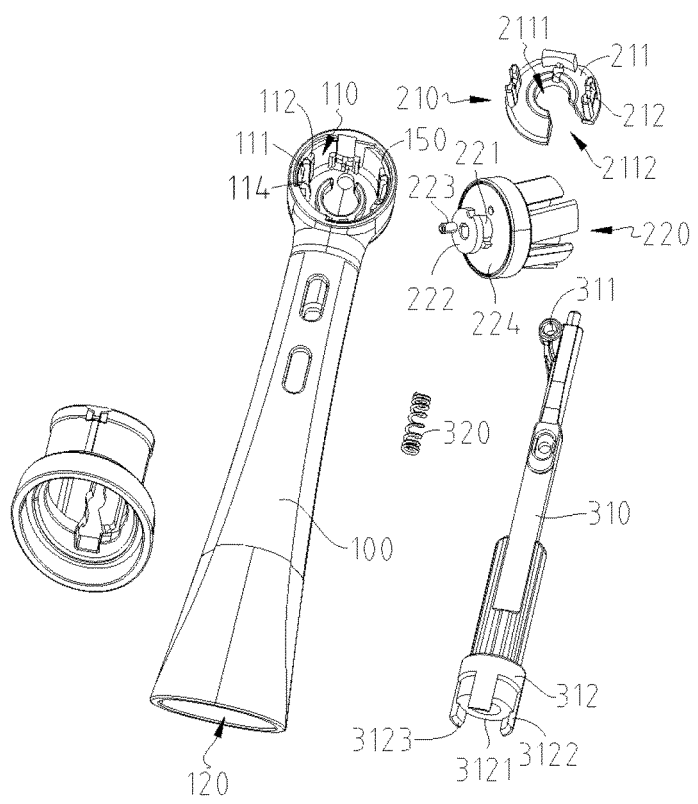
FIG. 2 illustrates an exploded structural view of the electric toothbrush head according to an embodiment of the disclosure.
Figure 3:
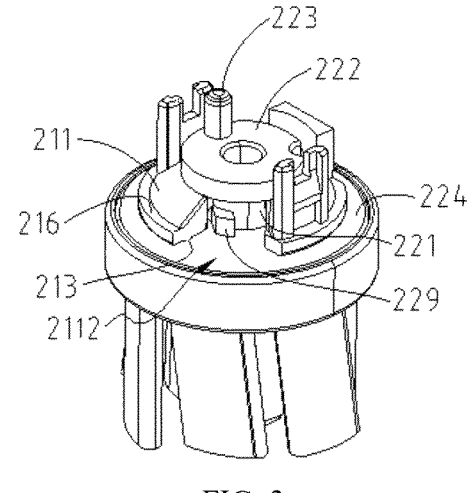
FIG. 3 illustrates a schematic assembly structural view of a brush head assembly of the electric toothbrush head according to an embodiment of the disclosure.

In an embodiment, as illustrated in FIG. 1 through FIG. 3, the bristle planting head 220 includes a bristle planting disc 224. The bristle planting disc 224 is connected to an end of the rotary connecting part 221 facing away from the limiting part 222. The bracket 210 includes a matching part 211. The matching hole 2111 is defined in the matching part 211. A cross-sectional area of the limiting part 222 is larger than that of the matching hole 2111. The matching part 211 is disposed between the bristle planting disc 224 and the limiting part 222. The limiting part 222 cannot pass through the matching hole 2111, so freedom of the bristle planting head 220 along an axial direction of the matching hole 2111 is restricted, and the bristle planting head 220 cannot move relative to the bracket 210 along the axial direction of the matching hole 2111.

In an available implementation method, a side of the bristle planting disc 224 facing away from the rotary connecting part 221 is provided with bristle tufts for cleaning teeth.

It should be understood that, the limiting part 222 and the rotary connecting part 221 can be separately disposed or integrally formed with each other.

Figure 4:
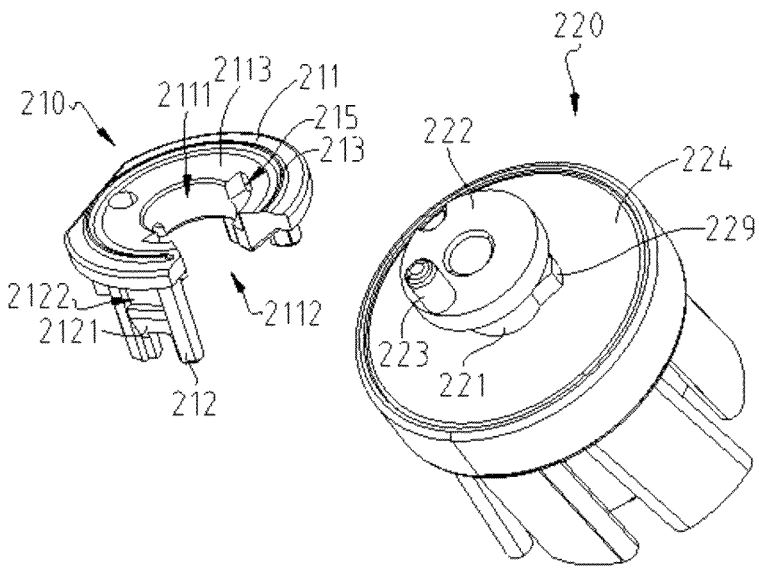
FIG. 4 illustrates an exploded structural view of the brush head assembly of the electric toothbrush head according to an embodiment of the disclosure.
Figure 5:
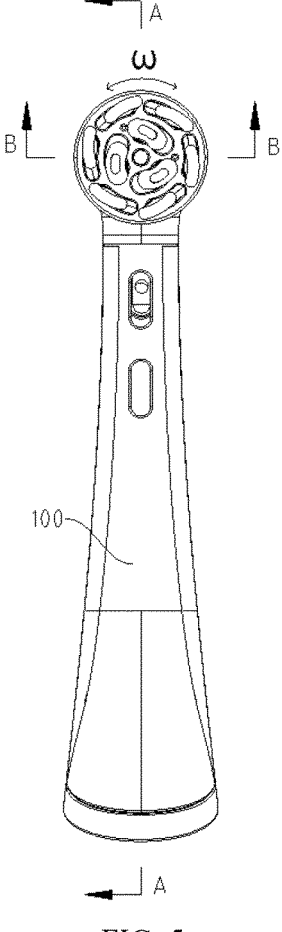
FIG. 5 illustrates a schematic structural view of the electric toothbrush head according to an embodiment of the disclosure from a top view, wherein @ represents a swing direction of a bristle planting head.

To further simplify a structure design of the bristle planting head 220 and simplify the assembly process of the brush head assembly 200, in the embodiment, as illustrated in FIG. 3 and FIG. 4, a notch 2112 is defined on a side surface of the bracket 210. The notch 2112 is connected to the matching hole 2111. A minimum distance of two ends of the notch 2112 is smaller than a diameter of the rotary connecting part 221. The notch 2112 is configured to allow the rotary connecting part 221 to pass through and move into the matching hole 2111. That is, the rotary connecting part 221 can be installed into the matching hole 2111 through the notch 2112.

Based on this, the rotary connecting part 221, the limiting part 222, and the bristle planting disc 224 can be designed as an integrated structure. In this way, a situation that a distance between the bristle planting disc 224 and the limiting part 222 is increased due to assembly tolerance can be reduced, which is beneficial to reducing a situation that the bristle planting head 220 jumps along the axial direction of the matching hole 2111 during rotating to cause increased vibration or noise. At the same time, by designing the rotary connecting part 221, the limiting part 222, and the bristle planting disc 224 as the integrated structure, it is also beneficial to simplifying an assembly process of the bristle planting head 220, thereby simplifying the assembly process of the brush head assembly 200 and the electric toothbrush head, and reducing an assembly cost.

In addition, since the bristle planting head 220 is installed into the matching hole 2111 through the notch 2112 on the side surface of the bracket 210, a spacing between the limiting part 222 and the bristle planting disc 224 can be designed to be suitable for rotation of the bristle planting head 220. In this way, the situation that the bristle planting head 220 jumps along the axial direction of the matching hole 2111 can be reduced while ensuring the rotation stability of the bristle planting head 220, which is beneficial to reducing the vibration and the working noise, thereby optimizing user experience.

It should be understood that, the bracket 210 can be elastically deformed to some extent. Based on this, after the rotary connecting part 221 enters the matching hole 2111 through the notch 2112 on the side surface of the bracket 210, the bracket 210 can restore its shape, thereby avoiding a situation that rotation vibration or working noise of the bristle planting head 220 is increased due to deformation of the bracket 210.

It should be noted that, in the embodiments of the disclosure, an outer contour of the bracket 210 is matched with the mounting chamber 110. The outer contour of the bracket 210 is limited after the bracket 210 is installed into the mounting chamber 110 of the housing 100. In addition, the rotary connecting part 221 is matched with the matching hole 2111, and the bracket 210 cannot be slightly deformed toward the mating hole 2111. In this way, stability of an axis of the matching hole 2111 can be ensured, so that the rotary connecting part 221 can rotate stably in the matching hole 2111, which is beneficial to reducing the vibration.

In an embodiment, as illustrated in FIG. 3 and FIG. 4, a width of the notch 2112 gradually increases along a direction facing away from the rotary connecting part 221. That is, an opening width of the notch 2112 facing toward the matching hole 2111 is smaller than that facing away from the matching hole 2111. In this way, a contact area between the matching hole 2111 and the rotary connecting part 221 can be increased, and a probability of the rotary connecting part 221 jumping toward an outer side of the notch 2112 can be reduced, which is helpful to reduce radial jumping of the bristle planting head 220 during rotating and reduce the vibration. At the same time, the opening width of the notch 2112 is gradually increased along the direction facing away from the rotary connecting part 221, which facilitates alignment of the rotary connecting part 221 with an opening of the notch 2112 during assembly, helps to install the rotary connecting part 221 into the matching hole 2111, and is beneficial to improving assembly efficiency.

In some embodiments of the disclosure, as illustrated in FIG. 3 and FIG. 4, the bracket 210 includes an abutting part 213. The abutting part 213 is disposed on a side of the matching part 211 facing toward the bristle planting disc 224 and protrudes relative to a surface of the matching part 211. A cross-sectional area of the abutting part 213 is smaller than an area of an end surface of the matching part 211 facing toward the bristle planting disc 224. The embodiment reduces a rotation area between the bristle planting disc 224 and the bracket 210 by providing the abutting part 213 protruding relative to the surface of the matching part 211, which helps to reduce a rotation resistance of the bristle planting head 220 and a driving force for driving the bristle planting head 220 to rotate. In this way, vibration of the push rod 310 and the elastic piece 320 during operation can be reduced.

Figure 7:
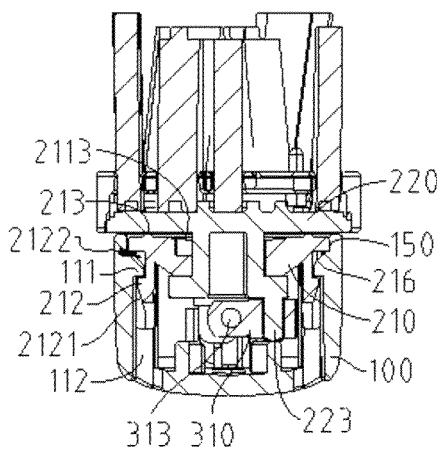
FIG. 7 illustrates a sectional structural view of FIG. 5 along B-B.
Figure 8:
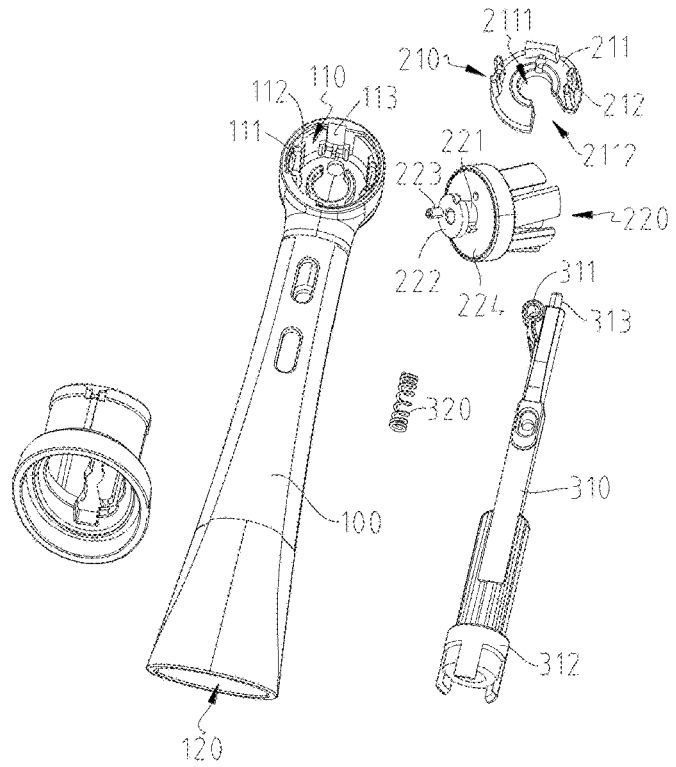
FIG. 8 illustrates an exploded structural view of the electric toothbrush head illustrated in FIG. 5.
Figure 9:
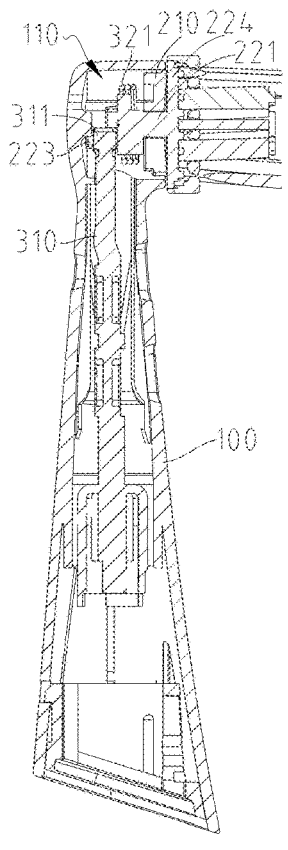
FIG. 9 illustrates a sectional structural view of the electric toothbrush head according to an embodiment of the disclosure.
Figure 10:
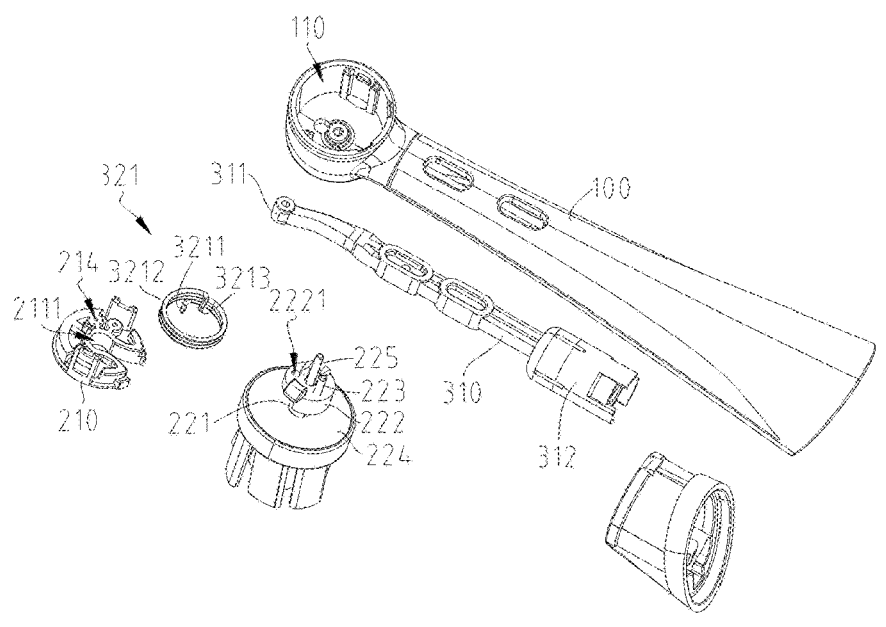
FIG. 10 illustrates an exploded structural view of the electric toothbrush head illustrated in FIG. 9.
Figure 11:
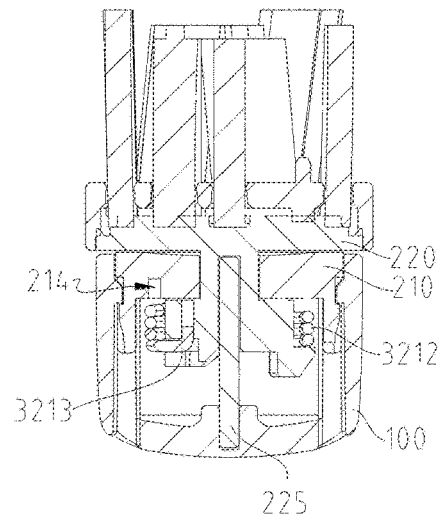
FIG. 11 illustrates another sectional structural view of the electric toothbrush head illustrated in FIG. 9.
Figure 12:
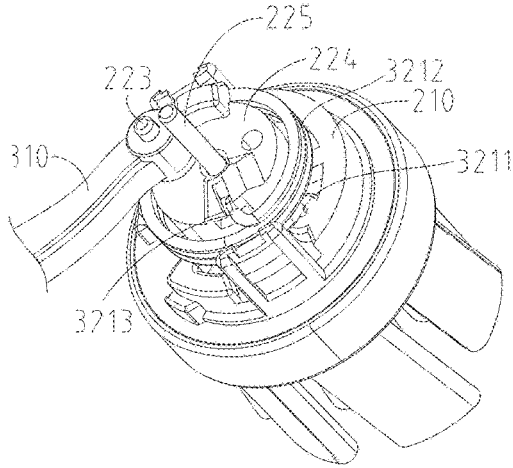
FIG. 12 illustrates a schematic assembly view of part of structures of the electric toothbrush head illustrated in FIG. 9.

In the embodiment, as illustrated in FIG. 4 and FIG. 7, the abutting part 213 is disposed around a periphery of the matching hole 2111, so that a gap between the abutting part 213 and the bristle planting disc 224 at different positions in a circumferential direction of the matching hole 2111 is basically the same, which is beneficial to reducing a shaking amplitude of the bristle planting head 220 during rotating and reducing the vibration and noise.

In an embodiment, as illustrated in FIG. 4 and FIG. 7, the abutting part 213 is distributed around a middle part of the end surface of the matching part 211 along a radial direction of the mating hole 2111, so that the abutting part 213 can abut against a position close to an outer edge of the bristle planting disc 224 as much as possible. In this way, large axial swing of the bristle planting disc 224 during rotating can be reduced, which is helpful to further reduce the vibration.

In the embodiments of the disclosure, the bristle planting head 220 is rotatably installed in the matching hole 2111 of the bracket 210. In other implementation methods, the bristle planting head 220 is not provided with a fixed central shaft 225, which will cause the bristle planting head 220 to swing slightly during reciprocating rotation. That is, an actual rotating axis of the bristle planting head 220 may not completely coincide with the axial direction of the matching hole 2111, causing the bristle planting disc 224 prone to contacting and rubbing with a side of the bracket 210 facing toward the bristle planting disc 224 during rotating and generating noise.

Based on this, to reduce probability of the bristle planting disc 224 contacting with the bracket 210 to thereby reduce the noise, in the embodiment, as illustrated in FIG. 4 and FIG. 7, a distance between the matching part 211 and the bristle planting disc 224 gradually decreases along the radial direction of the matching hole 2111. That is, the matching part 211 is provided with a first slope surface 2113 facing toward the matching hole 2111. Among all positions on the first slope surface 2113, a distance between a position closer to the matching hole 2111 and the bristle planting disc 224 is larger. In this way, probability of contact between this position and the bristle planting disc 224 can be reduced, which is beneficial to reducing the vibration and noise of the bristle planting head 220 during rotating and optimizing the user experience.

In some embodiments of the disclosure, as illustrated in FIG. 3 and FIG. 4, an outer periphery of the rotary connecting part 221 is provided with a rotary limiting block 229, and the bracket 210 is defined with a movable groove 215. The movable groove 215 is connected to the notch 2112 and configured to accommodate the rotary limiting block 229 and restrict a rotation angle of the rotary limiting block 229, so that the bristle planting head 220 can reciprocatively rotate within a fixed angle.

In the aforementioned embodiment, the movable groove 215 is connected to the notch 2112, so that the rotary limiting block 229 can be installed into the movable groove 215 through the notch 2112. That is, a step of installing the rotary limiting block 229 into the movable groove 215 can be completed synchronously with a step of installing the rotary connecting part 221 into the matching hole 2111, which is beneficial to simplifying assembly steps. The rotary limiting block 229 can be installed into the movable groove 215 through the notch 2112, so that a rotation angle of the bristle planting head 220 can be restricted by the bracket 210 and the rotary limiting block 229, which is beneficial to simplifying the structure of the brush head assembly 200 and optimizing product cost.

It should be understood that, the movable groove 215 is coaxially disposed relative to the matching hole 2111. An arc length of the movable groove 215 is specifically set according to the rotation angle of the bristle planting head 220.

In some embodiments of the disclosure, as illustrated in FIG. 2, FIG. 4 and FIG. 7, the bracket 210 includes first fixing parts 212. The first fixing parts 212 are disposed on a side of the bracket 210 facing toward a bottom wall of the mounting chamber 110. The first fixing parts 212 are provided with guiding surfaces 2121 and accommodating grooves 2122. The accommodating grooves 2122 are defined between the guiding surfaces 2121 and the bristle planting head 220. The accommodating grooves 2122 are defined by recessing toward a side facing toward the rotary connecting part 221 with positions of tail parts of the guiding surfaces 2121 as references, respectively. Second fixing parts 111 are disposed on a chamber wall of the mounting chamber 110 at positions corresponding to the accommodating grooves 2122. The second fixing parts 111 are clamped and matched with the accommodating grooves 2122, respectively. Each of the second fixing parts 111 is partially located between two side walls of a corresponding one of the accommodating grooves 2122 along a circumferential direction of the rotary connecting part 221.

When the second fixing parts 111 are located inside the accommodating grooves 2122, the bracket 210 cannot detach from the mounting chamber 110 along the axial direction of the matching hole 2111. At the same time, each of the second fixing parts 111 is located between the two side walls of a corresponding one of the accommodating grooves 2122; that is, the two side walls of each of the accommodating grooves 2122 can block a corresponding one of the second fixing parts 111, to thereby restrict the bracket 210 from rotating in the circumferential direction of the matching hole 2111. In this way, the bracket 210 can be fixed in the mounting chamber 110.

In an embodiment, as illustrated in FIG. 2, FIG. 4 and FIG. 7, in some embodiments of the disclosure, two convex structures 112 are disposed on the chamber wall of the mounting chamber 110 at positions corresponding to two sides of each of the first fixing parts 212. A limiting groove 114 is defined between the two convex structures 112. Each of the first fixing parts is at least partially disposed inside the limiting groove 114. The limiting grove is configured to limit rotation of a corresponding one of the first fixing parts 212 along the circumferential direction of the rotary connecting part 221.

In practical application, shapes of the two convex structures 112 on sides facing toward the corresponding one of the first fixing part 212 are matched with that of the corresponding one of the first fixing parts 212, and the two convex structures 112 are abutted against the corresponding one of the first fixing parts 212 to minimize gaps between the two convex parts 112 and the corresponding one of the first fixing parts 212. In this way, each of the first fixing parts 212 is avoided from loosening relative to the limiting groove 114, thereby reducing the vibration and the noise.

In some embodiments of the disclosure, as illustrated in FIG. 2, FIG. 3, and FIG. 7, a limiting step 150 is disposed on the housing 100 at an opening of the mounting chamber 110. The limiting step 150 is configured to abut against a lower end surface 216 of the bracket 210. The limiting step 150 can support the lower end surface 216 of the bracket 210, and at the same time can restrict the lower end surface 216 of the bracket 210 from moving toward the bottom wall of the mounting chamber 110. Through cooperation between the limiting step 150 and the lower end surface 216 of the bracket 210 and cooperation between the first fixing parts 212 and the second fixing parts 111, the bracket 210 can be fixed in the axial direction of the matching hole 2111.

It should be noted that, the matching hole 2111 is defined on the bracket 210, and the bristle planting head 220 is connected to the matching hole 2111 through the rotary connecting part 221. When the bristle planting head 220 rotates only around a virtual rotating axis defined by the matching hole 2111 of the bracket 210, installation stability of the bracket 210 greatly affects the rotation stability of the bristle planting head 220. In the embodiments of the disclosure, the bracket 210 is closely matched with the housing 100 through the above disposition, which reduces looseness of the bracket 210 relative to the housing 100, facilitates the stable reciprocating rotation of the bristle planting head 220, and can effectively reduce the noise and vibration, thereby improving the user experience.

In some embodiments of the disclosure, as illustrated in FIG. 2, the push rod 310 includes a first connecting part 311 and a second connecting part 312. The first connecting part 311 is configured to connect to the linkage shaft 223, and the second connecting part 312 is configured to abut against the main shaft to thereby push the push rod 310 to move through the main shaft.

Figure 6:
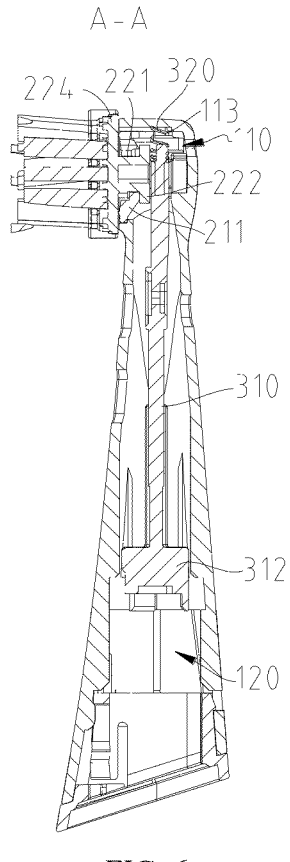
FIG. 6 illustrates a sectional structural view of FIG. 5 along A-A.

In an embodiment, as illustrated in FIG. 2 and FIG. 6, the second connecting part 312 includes a connecting body 3121 and a guiding structure 3122 disposed on a periphery of the connecting body 3121. The guiding structure 3122 protrudes from an end surface of the connecting body 3121. As can be seen from FIG. 2 and FIG. 6, the guiding structure 3122 and the end face of the connecting body 3121 together enclose an accommodating space for cooperating with the main shaft for at least partially accommodating the main shaft, so as to facilitate the main shaft to push the push rod 310 to move.

In the embodiment, the guiding structure 3122 may be a solid structure continuously distributed in a circumferential direction of the connecting body 3121, or a structure composed of multiple protrusions distributed at intervals in the circumferential direction of the connecting body 3121.

In the embodiment, as illustrated in FIG. 2 and FIG. 4, the guiding structure 3122 is the structure composed of the multiple protrusions distributed at intervals in the circumferential direction of the connecting body 3121. The multiple protrusions are three in quantity.

In the aforementioned embodiments, to enable the electric toothbrush head to be detachably installed on a handle of the electric toothbrush, the main shaft and the second connecting part 312 of the push rod 310 are not fixedly connected. That is, in a process of driving the bristle planting head 220 to reciprocatively rotate, the main shaft and the second connecting part 312 may be separated for a short time, and then abut again. Therefore, the vibration and noise are easily generated between the main shaft and the second connecting part 312.

To address the aforementioned problems, in the embodiment, as illustrated in FIG. 2 and FIG. 6, the guiding structure 3122 is provided with connecting slope surfaces 3123. The connecting slope surfaces 3123 are configured to contact with the main shaft to reduce motion noise.

Specific structures and assembly methods of the elastic piece 320 in the electric toothbrush head provided by the embodiments of the disclosure form the first aspect will be described in detail with specific embodiments in combination with the attached drawings. It should be understood that the following embodiments are only exemplary descriptions.

In an embodiment of the disclosure, as illustrated in FIG. 5 through FIG. 8, a first positioning part 113 is disposed on the chamber wall of the mounting chamber 110. The push rod 310 is provided with a second positioning part 313. An end of the elastic piece 320 is abutted against the first positioning part 113, and another end of the elastic piece 320 is connected to the second positioning part 313. The elastic piece 320 is disposed on an extension side of the push rod 310. When the push rod 310 moves toward the side facing toward the linkage shaft 223 along its own axial direction, the push rod 310 pushes the bristle planting head 220 to rotate and compresses the elastic piece 320 at the same time. When a force acted on the push rod 310 is cancelled, the elastic piece 320 releases the elastic force to push the push rod 310 to move toward the side facing away from the linkage shaft 223, and the push rod 310 drives the bristle planting head 220 to rotate reversely. When the push rod 310 moves toward the side facing toward the linkage shaft 223 again, the push rod 310 drives the bristle planting head 220 to rotate reversely and compresses the elastic piece 320 again. The aforementioned cycle is repeated to enable the bristle planting head 220 to reciprocatively rotate around the axis of the rotary connecting part 221.

In aforementioned embodiment, the elastic piece 320 is configured to provide a reverse pushing force for the push rod 310, and structural forms of the elastic piece 320 can be varied. For example, the elastic member 320 is the spring or an elastic plate. A shape of the spring can be cylindrical, conical or irregular, but it is not limited to this. The elastic plate can be an elastic sheet with elasticity.

In an available embodiment, as illustrated in FIG. 5 through FIG. 8, the elastic piece 320 is the spring. Specifically, the first positioning part 113 is disposed on the housing 100 is at a position corresponding to the extension side of the push rod 310, and the first positioning part 113 is specifically a groove capable of accommodating the spring. The second positioning part 313 is disposed on a top of the push rod 310, and the second positioning part 313 is specifically a column structure protruding from an end of the push rod 310. One end of the spring is disposed in the groove, and another end of the spring is sleeved on a periphery of the second positioning part 313. In this way, the spring can be positioned, thereby reducing a situation where the spring deviates from its design position during reciprocating expansion and contraction to cause spring failure. At the same time, in the embodiment, the first positioning part 113, the spring, and the second positioning part 313 are all located on the extension side of the push rod 310; that is, they are on a same straight line. In this way, a force exerted by the spring on the push rod 310 is consistent with a moving direction of the push rod 310, which can reduce swing or vibration of the push rod 310, help improve the force transmission efficiency and reduce the working noise.

During a practical assembly process, the rotary connecting part 221 of the bristle planting head 220 is clamped into the matching hole 2111 through the notch 2112 on the side surface of the bracket 210 to assemble the brush head assembly 200. At this time, the bracket 210 is located between the bristle planting disc 224 and the limiting part 222 of the bristle planting head 220, so that the bristle planting head 220 can be limited and fixed in the axial direction of the matching hole 2111, and at the same time, the bristle planting head 220 can rotate relative to the bracket 210 in the matching hole 2111 with the axial direction of the matching hole 2111 as the rotating axis. Subsequently, the spring is installed on the second positioning part 313 of the push rod 310. Then, the push rod 310 and the spring are loaded into the accommodating chamber 120 from an end of the accommodating chamber 120 facing away from the mounting chamber 110, and the first connecting part 311 of the push rod 310 is located in the mounting chamber 110, while another end of the elastic piece 320 is abutted against the first positioning part 113. Subsequently, the brush head assembly 200 is overall installed into the mounting chamber 110, and the brush head assembly 200 is fixed in the mounting chamber 110 through cooperating connection between the bracket 210 and the mounting chamber 110. During installing the brush head assembly 200, the linkage shaft 223 of the bristle planting head 220 is matched with the first connecting part 311 of the push rod 310. In this way, assembly of the electric toothbrush head of this embodiment can be realized.

In another embodiment of the disclosure, as illustrated in FIG. 9 through FIG. 12, the elastic piece 320 is a first torsion spring 321. The first torsion spring 321 includes a first connecting end 3211, a torsion spring body 3212, and a second connecting end 3213. The first connecting end 3211 is connected to an end of the torsion spring body 3212, and the second connecting end 3213 is connected to another end of the torsion spring body 3212. The bracket 210 is defined with a first connecting hole 214. The first connecting end 3211 is matched with and connected to the first connecting hole 214. The torsion spring body 3212 is spirally wound around on a periphery of the limiting part 222. The limiting part 222 is defined with a second connecting hole 2221. The second connecting end 3213 is matched with and connected to the second connecting hole 2221.

When the push rod 310 moves toward the side facing toward the linkage shaft 223, the push rod 310 drives the bristle planting head 220 to rotate through the linkage shaft 223, and at the same time drives the torsion spring body 3212 to rotate around a circumferential direction of the limiting part 222 to thereby tighten the torsion spring body 3212. When a force exerted by the main shaft on the push rod 310 is cancelled, elastic potential energy stored in the torsion spring body 3212 is released to drive the bristle planting head 220 to rotate reversely. The bristle planting head 220 drives the push rod 310 to move toward the side facing away from the linkage shaft 223 through the linkage shaft 223, and then the push rod 310 moves toward the side facing toward the linkage shaft 223 again under action of the main shaft. The aforementioned cycle is repeated to enable the bristle planting head 220 to reciprocatively rotate around the axis of the rotary connecting part 221.

In the aforementioned embodiment, the first torsion spring 321 drives the bristle planting head 220 to rotate circularly by the torsion force. Specifically, the torsion spring body 3212 is coaxially disposed relative to the bristle planting head 220. The torsion spring body 3212 drives the bristle planting head 220 to rotate circularly through the second connecting end 3213. In this process, a direction of a force exerted by the first torsion spring 321 on the bristle planting head 220 is always tangent to a circumferential direction of the bristle planting head 220, which is beneficial to improving the rotation stability of the bristle planting head 220. At the same time, compared with driving the bristle planting head 220 to rotate by the elastic force or the magnetic force, this embodiment drives the bristle planting head 220 to rotate circularly by the torsion force, so that the force transmission efficiency is higher and force transmission is more stable.

In an embodiment, in the aforementioned embodiment, the bottom wall of the mounting chamber 110 is defined with a limiting hole. The limiting hole is configured to movably connect to one end of the central shaft 225, and the other end of the central shaft 225 is rotatably connected to the limiting part 222 of the bristle planting head 220. The central shaft 225 is coaxially disposed relative to the rotary connecting part 221. In this way, swing of a root of the bristle planting head 220 can be reduced, so that the bristle planting head 220 can move stably and circularly under restrict of the central shaft 225, which is beneficial to improving the rotation stability and shock absorption effect, thereby reducing the noise.

It should be understood that, in the aforementioned embodiment, since a structural form and an installation position of the first torsion spring 321 will not interfere with the central shaft 225, the swing of the root of the bristle planting head 220 can be reduced by setting the central shaft 225.

During the practical assembly process, a center of the limiting part 222 is defined with a circular hole, and the central shaft 225 is installed in the circular hole. One side of the circular hole is provided with another circular hole, and the linkage shaft 223 is installed in the another circular hole. Subsequently, the rotary connecting part 221 of the bristle planting head 220 is clamped into the matching hole 2111 through the notch 2112 on the side surface of the bracket 210 to assemble the brush head assembly 200. At this time, the bracket 210 is located between the bristle planting disc 224 and the limiting part 222 of the bristle planting head 220, so that the bristle planting head 220 can be limited and fixed in the axial direction of the matching hole 2111, and at the same time, the bristle planting head 220 can rotate relative to the bracket 210 in the matching hole 2111 with the axial direction of the matching hole 2111 as the rotating axis. Then, the torsion spring body 3212 of the first torsion spring 321 is sleeved on the periphery of the limiting part 222, and the first connecting end 3211 is inserted into the first connecting hole 214 of the bracket 210, and the second connecting end 3213 is inserted into the second connecting hole 2221 of the limiting part 222. Subsequently, the push rod 310 is loaded into the accommodating chamber 120 from the end of the accommodating chamber 120 facing away from the mounting chamber 110, and the first connecting part 311 of the push rod 310 is located in the mounting chamber 110. Then, the brush head assembly 200 is overall installed into the mounting chamber 110, and the brush head assembly 200 is fixed in the mounting chamber 110 through the cooperating connection between the bracket 210 and the mounting chamber 110. At this time, the linkage shaft 223 of the bristle planting head 220 is matched with the first connecting part 311 of the push rod 310. In this way, the assembly of the electric toothbrush head of this embodiment can be realized.

Figure 13:
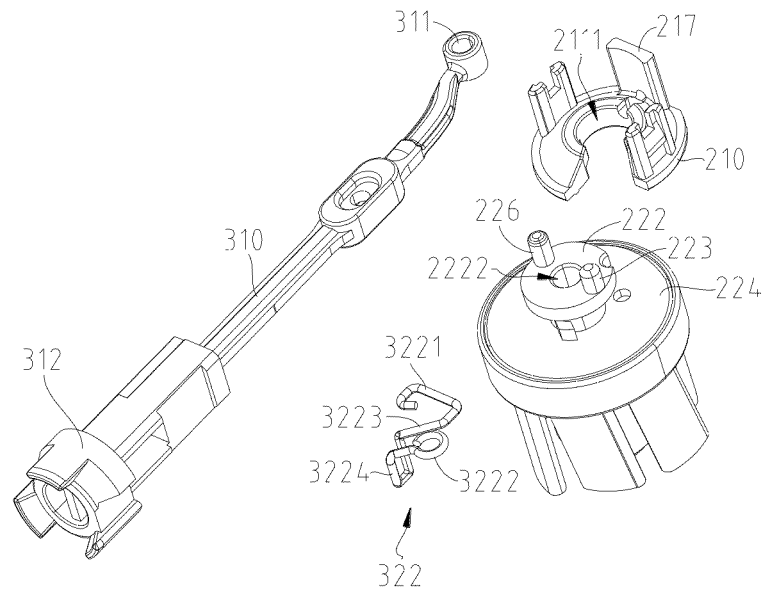
FIG. 13 illustrates an exploded structural view of the electric toothbrush head according to an embodiment of the disclosure.
Figure 14:
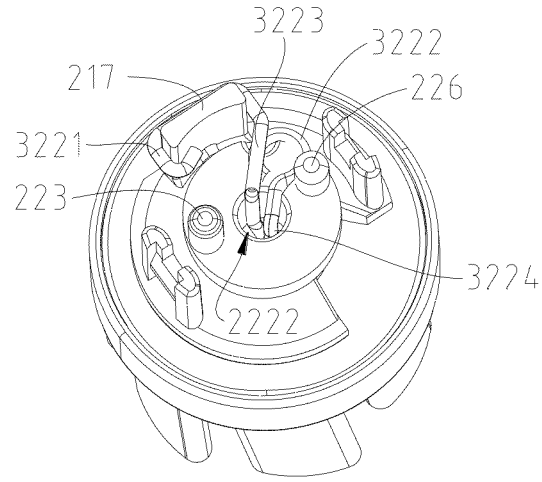
FIG. 14 illustrates a schematic assembly view of the brush head assembly and a second torsion spring of the electric toothbrush head illustrated in FIG. 13, where a fourth connecting end is not matched with a positioning column.

In further another embodiment of the disclosure, as illustrated in FIG. 13 and FIG. 14, the elastic piece 320 is a second torsion spring 322. A first connecting column 217 is disposed on the bracket 210. A positioning column 226 is disposed on the limiting part 222. The second torsion spring 322 includes a third connecting end 3221 and a fourth connecting end 3222. The third connecting end 3221 is sleeved on a periphery of the first connecting column 217. The fourth connecting end 3222 is sleeved on a periphery of the positioning column 226. The positioning column 226 is eccentrically disposed relative to the rotary connecting part 221.

In this way, when the push rod 310 moves toward the side facing toward the linkage shaft 223, a position of the third connecting end 3221 relative to the fourth connecting end 3222 of the second torsion spring 322 will change. At this time, a central angle between the third connecting end 3221 and the fourth connecting end 3222 relative to the rotating axis of the bristle planting head 220 will increase, so that elastic potential energy is stored in the second torsion spring 322. When the force exerted by the main shaft on the push rod 310 is cancelled, the elastic potential energy stored in the second torsion spring 322 is released to drive the bristle planting head 220 to rotate reversely through the positioning column 226, while the bristle planting head 220 drives the push rod 310 to move toward the side facing away from the linkage shaft 223 through the linkage shaft 223. When the main shaft drives the push rod 310 to move toward the side facing toward the linkage shaft 223 again, the second torsion spring 322 is twisted again. The aforementioned cycle is repeated to enable the bristle planting head 220 to reciprocatively rotate around the axis of the rotary connecting part 221.

It should be noted that, in a structure illustrated in FIG. 14, the fourth connecting end 3222 is not sleeved onto the periphery of the positioning column 226. In the actual assembly process, the fourth connecting end 3222 needs to be sleeved on the positioning column 226, so that the fourth connecting end 3222 can drive the bristle planting head 220 to rotate through the positioning column 226.

In the embodiment, as illustrated in FIG. 13 and FIG. 14, the second torsion spring 322 includes a first torsion part 3223 and a second torsion part 3224. An end of the first torsion part 3223 is connected to the third connecting end 3221, and another end of the first torsion part 3223 is connected to an end of the second torsion part 3224. The first torsion part 3223 extends to a rotation axis of the rotary connecting part 221 along a radial direction of the rotary connecting part 221. An accommodating hole 2222 is defined at a center of the limiting part 222. The second torsion part 3224 is at least partially disposed inside the accommodating hole 2222. Another end of the second torsion part 3224 is connected to the fourth connecting end 3222. The second torsion part 3224 and the first torsion part 3223 are not completely in a same plane.

In the embodiment, as illustrated in FIG. 13 and FIG. 14, the positioning column 226 and the linkage shaft 223 are located on a same diameter passing through the axis of the rotary connecting part 221; that is, the positioning column 226, the linkage shaft 223, and the axis of the rotary connecting part 221 are in the same plane.

During the practical assembly process, the rotary connecting part 221 of the bristle planting head 220 is clamped into the matching hole 2111 through the notch 2112 on the side surface of the bracket 210 to assemble the brush head assembly 200. At this time, the bracket 210 is located between the bristle planting disc 224 and the limiting part 222 of the bristle planting head 220, so that the bristle planting head 220 can be limited and fixed in the axial direction of the matching hole 2111, and at the same time, the bristle planting head 220 can rotate relative to the bracket 210 in the matching hole 2111 with the axial direction of the matching hole 2111 as the rotating axis. Subsequently, the second torsion spring 322 is sleeved and fixed onto the brush head assembly 200. Subsequently, the push rod 310 is loaded into the accommodating chamber 120 from the end of the accommodating chamber 120 facing away from the mounting chamber 110, and the first connecting part 311 of the push rod 310 is located in the mounting chamber 110. Then, the brush head assembly 200 is overall installed into the mounting chamber 110, and the brush head assembly 200 is fixed in the mounting chamber 110 through the cooperating connection between the bracket 210 and the mounting chamber 110. At this time, the linkage shaft 223 of the bristle planting head 220 is matched with the first connecting part 311 of the push rod 310. In this way, the assembly of the electric toothbrush head of this embodiment can be realized.

Figure 15:
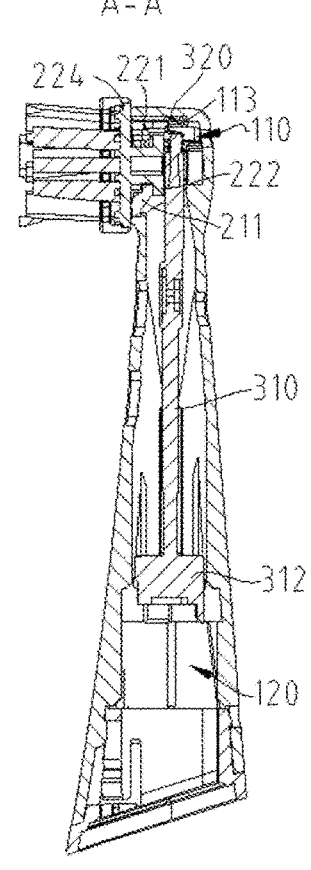
FIG. 15 illustrates a sectional structural view of the electric toothbrush head according to an embodiment of the disclosure.
Figure 16:
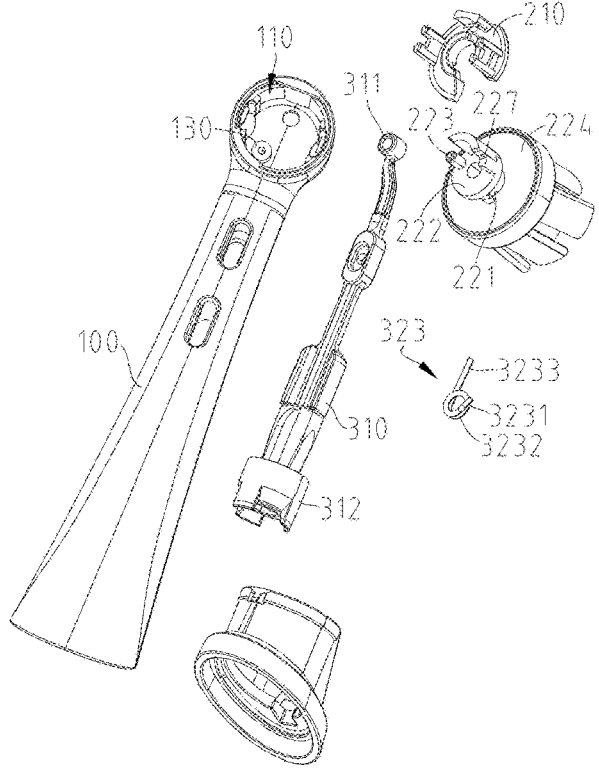
FIG. 16 illustrates an exploded structural view of the electric toothbrush head illustrated in FIG. 15.

In still another embodiment of the disclosure, as illustrated in FIG. 15 and FIG. 16, a second connecting column 130 is disposed on a bottom of the mounting chamber 110. The elastic piece 320 is a third torsion spring 323. The third torsion spring 323 includes a fixed abutting section 3231, a first spiral section 3232, and a first elastic driving rod 3233 sequentially connected in that order. The fixed abutting section 3231 is abutted against the chamber wall of the mounting chamber 110. The first spiral section 3232 is sleeved on a periphery of the second connecting column 130. The bristle planting head 220 is provided with an abutting structure 227, and the abutting structure 227 is disposed on the limiting part 222. The first elastic driving rod 3233 is abutted against a side surface of the abutting structure 227. When the push rod 310 drives the linkage shaft 223 to rotate, the linkage shaft 223 drives the first elastic driving rod 3233 to rotate through the limiting part 222 and the abutting structure 227, so that the third torsion spring 323 twists and stores elastic potential energy. When the force exerted by the main shaft on the push rod 310 is cancelled, the third torsion spring 323 drives the abutting structure 227 to rotate reversely through the first elastic driving rod 3233. The aforementioned cycle is repeated to enable the bristle planting head 220 to reciprocatively rotate around the axis of the rotary connecting part 221.

In the embodiment, as illustrated in FIG. 16, a concave part is disposed on the abutting structure 227 at a position abutting against the first elastic driving rod 3233, so that the first elastic driving rod 3233 at least partially falls at the concave part, thereby restricting the first elastic driving rod 3233 from moving along the side surface of the abutting structure 227 toward a side facing toward bristle planting disc 224.

During the practical assembly process, the rotary connecting part 221 of the bristle planting head 220 is clamped into the matching hole 2111 through the notch 2112 on the side surface of the bracket 210 to assemble the brush head assembly 200. At this time, the bracket 210 is located between the bristle planting disc 224 and the limiting part 222 of the bristle planting head 220, so that the bristle planting head 220 can be limited and fixed in the axial direction of the matching hole 2111, and at the same time, the bristle planting head 220 can rotate relative to the bracket 210 in the matching hole 2111 with the axial direction of the matching hole 2111 as the rotating axis. Then, the third torsion spring 323 is directly sleeved on the periphery of the second connecting column 130 at the bottom of the mounting chamber 110. Subsequently, the push rod 310 is loaded into the accommodating chamber 120 from the end of the accommodating chamber 120 facing away from the mounting chamber 110, and the first connecting part 311 of the push rod 310 is located in the mounting chamber 110. Then, the brush head assembly 200 is overall installed into the mounting chamber 110, and the brush head assembly 200 is fixed in the mounting chamber 110 through the cooperating connection between the bracket 210 and the mounting chamber 110. At this time, the linkage shaft 223 of the bristle planting head 220 is matched with the first connecting part 311 of the push rod 310. In this way, the assembly of the electric toothbrush head of this embodiment can be realized.

In further another embodiment of the disclosure, as illustrated in FIG. 17, a third connecting column 140 is disposed on the bottom of the mounting chamber 110. The third connecting column 140 is concentrically disposed relative to the rotary connecting part 221. The third connecting column 140 is defined with a first positioning groove 141. The elastic piece 320 is a fourth torsion spring 324. The fourth torsion spring 324 includes a rotation stopping part 3241, a second spiral section 3242 and a second elastic driving rod 3243 sequentially connected in that order. The rotation stopping part 3241 is matched with the first positioning groove 141. The second spiral section 3242 is sleeved on a periphery of the third connecting column 140. The second elastic driving rod 3243 is connected to the limiting part 222 to thereby drive the limiting part 222 to rotate. When the push rod 310 moves toward the side facing toward the linkage shaft 223, the first positioning groove 141 drives the second elastic driving rod 3243 to rotate, so that the fourth torsion spring 324 stores elastic potential energy. When the force exerted by the main shaft on the push rod 310 is cancelled, the fourth torsion spring 324 drives the bristle planting head 220 to rotate reversely through the second elastic driving rod 3243. The aforementioned cycle is repeated to enable the bristle planting head 220 to reciprocatively rotate around the axis of the rotary connecting part 221.

When the fourth torsion spring 324 is tightened, a radius of the fourth torsion spring 324 will be reduced to some extent, so that a position of the second elastic driving rod 3243 of the fourth torsion spring 324 will be changed. When the second elastic driving rod 3243 is connected to a fixed position of the limiting part 222, it is easy to change the rotating axis of the bristle planting head 220, thereby generating additional vibration.

Based on this, as illustrated in FIG. 17, a fourth connecting column 228 is disposed on the limiting part 222. The fourth connecting column 228 is eccentrically disposed relative to the rotary connecting part 221. The fourth connecting column 228 is defined with a second positioning groove 2281. The second positioning groove 2281 extends along an axial direction of the rotary connecting part 221. The second positioning groove 2281 extends along the radial direction of the rotary connecting part 221. The second elastic driving rod 3243 is movably disposed inside the second positioning groove 2281. In this way, the second elastic driving rod 3243 can move along the axial direction of the rotary connecting part 221 in the second positioning groove 2281, so that a situation that the rotating axis of the bristle planting head 220 is changed due to a change of the radius of the fourth torsion spring 324, thereby ensuring the rotation stability of the bristle planting head 220.

During the practical assembly process, the rotary connecting part 221 of the bristle planting head 220 is clamped into the matching hole 2111 through the notch 2112 on the side surface of the bracket 210 to assemble the brush head assembly 200. At this time, the bracket 210 is located between the bristle planting disc 224 and the limiting part 222 of the bristle planting head 220, so that the bristle planting head 220 can be limited and fixed in the axial direction of the matching hole 2111, and at the same time, the bristle planting head 220 can rotate relative to the bracket 210 in the matching hole 2111 with the axial direction of the matching hole 2111 as the rotating axis. Then, the fourth torsion spring 324 is directly sleeved on the periphery of the third connecting column 140 at the bottom of the mounting chamber 110, and the rotation stopping part 3241 is clamped into the first positioning groove 141. Subsequently, the push rod 310 is loaded into the accommodating chamber 120 from the end of the accommodating chamber 120 facing away from the mounting chamber 110, and the first connecting part 311 of the push rod 310 is located in the mounting chamber 110. Then, the brush head assembly 200 is overall installed into the mounting chamber 110, and the brush head assembly 200 is fixed in the mounting chamber 110 through the cooperating connection between the bracket 210 and the mounting chamber 110. At this time, the linkage shaft 223 of the bristle planting head 220 is matched with the first connecting part 311 of the push rod 310, and the second elastic driving rod 3243 of the fourth torsion spring 324 is matched with and connected to the second positioning groove 2281 on the bracket 210. In this way, the assembly of the electric toothbrush head of this embodiment can be realized.

In a second aspect, an electric tooth brush provided by the embodiment of the disclosure includes the handle and the electric toothbrush head. The electric toothbrush head is detachably installed on the handle.

Specifically, an end of the handle is connected to the housing 100. The main shaft is disposed inside the handle. The main shaft is abutted against an end of the push rod 310 facing away from the bristle planting head 220. The main shaft is configured to drive the push rod 310 to move toward the side facing toward the linkage shaft 223 along its axial direction.

In an embodiment, the electric toothbrush includes a driving device. The driving device is disposed inside the handle. An output end of the driving device is connected to the main shaft to drive the main shaft to move linearly, that is to drive the main shaft to move along its own axial direction. One end of the main shaft is abutted against the push rod 310, so that the main shaft can push the push rod 310 to move toward the side facing toward the linkage shaft 223, thereby driving the bristle planting head 220 to rotate.

In an example, the driving device can be a motor. An output end of the motor is connected to an end of the main shaft, and another end of the main shaft is abutted against an end of the push rod 310. The motor is used to drive the main shaft to move linearly, so as to push the push rod 310 to move along its own axis toward the side facing toward the linkage shaft 223.

As illustrated in FIG. 18, in a third aspect, an assembly method for the electric toothbrush head provided by the embodiment of the disclosure includes the following steps S110 through S120.

S110, the bracket 210 and the bristle planting head 220 are provided. The bracket 210 is defined with the matching hole 2111 and the notch 2112. The notch 2112 is defined on the side surface of the bracket 210 and connected to the matching hole 2111. The bristle planting head 220 includes the rotary connecting part 221 and the linkage shaft 223. The rotary connecting part 221 is clamped into the matching hole 2111 through the notch 2112.

S120, the housing 100 and the push rod 310 are provided. The housing 100 is defined with the mounting chamber 110 and the accommodating chamber 120. The accommodating chamber 120 is connected to the mounting chamber 110. The push rod 310 is installed into the accommodating chamber 120. An end of the push rod 310 is made to extend to the mounting chamber 110.

S130, the bristle planting head 220 and the bracket 210 are installed into the mounting chamber 110 together. The bracket 210 is matched with the mounting chamber 110. The linkage shaft 223 is connected to the push rod 310.

In this way, the rotary connecting part 221 of the bristle planting head 220 is clamped into the matching hole 2111 through the notch 2112 on the side surface of the bracket 210. The linkage shaft 223 is matched with and connected to the first connecting part 311 of the push rod 310.

In the assembly method for the electric toothbrush head provided by the disclosure, the rotary connecting part 221 of the bristle planting head 220 is clamped into the matching hole 2111 through the notch 2112 on the side surface of the bracket 210. Lateral positioning of the bristle planting head 220 is realized through cooperation between the matching hole 2111 and the rotary connecting part 221. At the same time, the bracket 210 is at least partially located between the bristle planting disc 224 and the limiting part 222, so that positioning of the bristle planting head 220 along the axial direction of the matching hole 2111 can be realized. Based on this, under a condition of realizing reciprocating rotation of the bristle planting head 220 with the rotary connecting part 221 as the rotating axis, it is beneficial to simplifying the assembly process of the electric toothbrush head and reducing the cost of the electric toothbrush head.

It should be noted that, the assembly method for the electric toothbrush head provided by the embodiment of the disclosure in the third aspect is applicable to the electric toothbrush head described above. In other words, assembly methods described in the embodiments of the electric toothbrush head belong to implementation methods of the assembly method provided by the embodiment of the disclosure in the third aspect, and will not be repeated here.

It should be noted that, the assembly method for the electric toothbrush head provided by the embodiment of the disclosure is applicable to the electric toothbrush head described in any one of the aforementioned embodiments, has all technical effects of the electric toothbrush head described above, and will not be repeated here.

In description of the disclosure, it should be understood that, orientational or positional relationships indicated by terms "central", "up", "down", "front", "back", "left", "right", "vertical", "horizontal", "top", "bottom", "inside", "outside", and so on are based on orientational or positional relationships illustrated in the attached drawings and are only for convenience of describing the disclosure and simplifying description, rather than indicating or implying that device or component referred to must have a specific orientation and be constructed and operated in a specific orientation, and therefore cannot be understood as a limitation to the disclosure.

Terms "first" and "second" are only used for descriptive purposes, and cannot be understood as indicating or implying relative importance or implicitly indicating a number of indicated technical features. Therefore, features defined as "first" and "second" may include one or more of these features explicitly or implicitly. In the description of the disclosure, unless otherwise specified, "multiple" means two or more.

In the description of the disclosure, it should be noted that, unless otherwise specified and limited, terms "install", "connect" and "link" should be broadly understood, for example, it can be fixed connection, detachable connection or integrated connection; direct connection, indirect connection through an intermediate medium, or connection inside two elements. For those skilled in the art, specific meanings of the above terms in the disclosure can be understood in specific situations.

In the description of the disclosure, specific features, structures, materials, or characteristics may be combined in any one or more embodiments or examples in a suitable manner.

It should be noted that, although steps in a flowchart of the attached drawings are shown in an order as indicated by arrows, these steps are not necessarily executed in the order as indicated by the arrows. Unless otherwise specified in the disclosure, execution of these steps is not strictly limited in the order as indicated by the arrows, and they can be executed in other orders. Moreover, at least a part of the steps in the flowchart of the attached drawings may include multiple sub-steps or stages. These sub-steps or stages are not necessarily be completed at the same time but may be executed at different times, and an execution order may not necessarily be sequential, but may be executed sequentially or alternately with other steps or at least a part of sub-steps or stages of other steps.

What is claimed is:

1. An electric toothbrush head, comprising:
   a housing, defined with a mounting chamber and an accommodating chamber, wherein the accommodating chamber is connected to the mounting chamber;
   a brush head assembly, comprising a bracket and a bristle planting head, wherein the bracket is fixedly disposed inside the mounting chamber, the bracket is defined with a matching hole, the bristle planting head comprises a rotary connecting part, a limiting part and a linkage shaft, the rotary connecting part is rotatably matched with the matching hole, the limiting part is connected to the rotary connecting part, and the linkage shaft is disposed on the limiting part and eccentrically disposed relative to the rotary connecting part;
   a driving assembly, comprising a push rod and an elastic piece, wherein the push rod is movably disposed inside the accommodating chamber, an end of the push rod is rotatably connected to the linkage shaft, another end of the push rod is configured to match with an external main shaft, and the elastic piece is disposed inside the mounting chamber and configured to drive the push rod to move facing away from the linkage shaft; and
   wherein the bristle planting head comprises a bristle planting disc, and the bristle planting disc is connected to an end of the rotary connecting part facing away from the limiting part; the bracket comprises a matching part, the matching hole is defined in the matching part, the matching part is disposed between the bristle planting disc and the limiting part, and a cross-sectional area of the limiting part is larger than that of the matching hole.

2. The electric toothbrush head as claimed in claim 1, wherein the bracket comprises an abutting part, the abutting part is disposed on a side of the matching part facing toward the bristle planting disc and protrudes relative to a surface of the matching part, and a cross-sectional area of the abutting part is smaller than an area of an end surface of the matching part facing toward the bristle planting disc.

3. The electric toothbrush head as claimed in claim 1, wherein a distance between the matching part and the bristle planting disc gradually decreases along a radial direction of the matching hole.

4. The electric toothbrush head as claimed in claim 1, wherein a notch is defined on a side surface of the bracket, the notch is connected to the matching hole, a minimum distance of two ends of the notch is smaller than a diameter of the rotary connecting part, and the notch is configured to allow the rotary connecting part to pass through and move into the matching hole.

5. The electric toothbrush head as claimed in claim 4, wherein a width of the notch gradually increases along a direction facing away from the rotary connecting part.

6. The electric toothbrush head as claimed in claim 1, wherein the bracket comprises first fixing parts, the first fixing parts are disposed on a side of the bracket facing toward a bottom wall of the mounting chamber, the first fixing parts are provided with guiding surfaces and accommodating grooves, the accommodating grooves are defined between the guiding surfaces and the bristle planting head, the accommodating grooves are defined by recessing toward a side facing toward the rotary connecting part with positions of tail parts of the guiding surfaces as references, respectively; second fixing parts are disposed on a chamber wall of the mounting chamber at positions corresponding to the accommodating grooves, the second fixing parts are clamped and matched with the accommodating grooves, respectively, and each of the second fixing parts is partially located between two side walls of a corresponding one of the accommodating grooves along a circumferential direction of the rotary connecting part.

7. The electric toothbrush head as claimed in claim 6, wherein two convex structures are disposed on the chamber wall of the mounting chamber at positions corresponding to two sides of each of the first fixing parts, a limiting groove is defined between the two convex structures, each of the first fixing parts is at least partially disposed inside the limiting groove, and the limiting groove is configured to limit rotation of a corresponding one of the first fixing parts along the circumferential direction of the rotary connecting part.

8. The electric toothbrush head as claimed in claim 1, wherein a limiting step is disposed on the housing at an opening of the mounting chamber, and the limiting step is configured to abut against a lower end surface of the bracket.

9. The electric toothbrush head as claimed in claim 1, wherein a first positioning part is disposed on a chamber wall of the mounting chamber, the push rod is provided with a second positioning part, an end of the elastic piece is abutted against the first positioning part, another end of the elastic piece is connected to the second positioning part, and the elastic piece is disposed on an extension side of the push rod.

10. The electric toothbrush head as claimed in claim 9, wherein the elastic piece is a spring or an elastic plate.

11. The electric toothbrush head as claimed in claim 1, wherein the elastic piece is a first torsion spring, the first torsion spring comprises a first connecting end, a torsion spring body, and a second connecting end, the first connecting end is connected to an end of the torsion spring body, and the second connecting end is connected to another end of the torsion spring body, the bracket is defined with a first connecting hole, the first connecting end is matched with and connected to the first connecting hole, the torsion spring body is sleeved on a periphery of the limiting part, the limiting part is defined with a second connecting hole, and the second connecting end is matched with and connected to the second connecting hole.

12. The electric toothbrush head as claimed in claim 1, wherein the elastic piece is a second torsion spring, a first connecting column is disposed on the bracket, a positioning column is disposed on the limiting part, the second torsion spring comprises a third connecting end and a fourth connecting end, the third connecting end is sleeved on a periphery of the first connecting column, and the fourth connecting end is sleeved on a periphery of the positioning column.

13. The electric toothbrush head as claimed in claim 12, wherein the second torsion spring comprises a first torsion part and a second torsion part, an end of the first torsion part is connected to the third connecting end, another end of the first torsion part is connected to an end of the second torsion part, the first torsion part extends to a rotation axis of the rotary connecting part along a radial direction of the rotary connecting part, an accommodating hole is defined at a center of the limiting part, the second torsion part is at least partially disposed inside the accommodating hole, and another end of the second torsion part is connected to the fourth connecting end.

14. The electric toothbrush head as claimed in claim 1, wherein a second connecting column is disposed on a bottom of the mounting chamber, the elastic piece is a third torsion spring; the third torsion spring comprises a fixed abutting section, a first spiral section, and a first elastic driving rod sequentially connected in that order; the fixed abutting section is abutted against a chamber wall of the mounting chamber, the first spiral section is sleeved on a periphery of the second connecting column, the bristle planting head is provided with an abutting structure, and the first elastic driving rod is abutted against a side surface of the abutting structure.

15. The electric toothbrush head as claimed in claim 1, a third connecting column is disposed on a bottom of the mounting chamber, the third connecting column is concentrically disposed relative to the rotary connecting part; the third connecting column is defined with a first positioning groove; the elastic piece is a fourth torsion spring, the fourth torsion spring comprises a rotation stopping part, a second spiral section and a second elastic driving rod sequentially connected in that order; the rotation stopping part is matched with the first positioning groove, the second spiral section is sleeved on a periphery of the third connecting column, and the second elastic driving rod is connected to the limiting part to thereby drive the limiting part to rotate.

16. The electric toothbrush head as claimed in claim 15, wherein a fourth connecting column is disposed on the limiting part, the fourth connecting column is eccentrically disposed relative to the rotary connecting part, the fourth connecting column is defined with a second positioning groove, the second positioning groove extends along an axial direction of the rotary connecting part, the second positioning groove extends along a radial direction of the rotary connecting part, and the second elastic driving rod is movably disposed inside the second positioning groove.

* * * * *